United States Patent Office 2,772,248
Patented Nov. 27, 1956

2,772,248
WATER-SOLUBLE EPOXY-AMINE RESINS

Emanuel R. Lieberman, Woodside, and Henry Yuska, Kew Gardens, N. Y., assignors to Interchemical Corporation, New York, N. Y., a corporation of Ohio No Drawing. Application May 4, 1953, Serial No. 353,001

11 Claims. (Cl. 260—29.2)

This invention relates to new fusible resins; more particularly, the invention relates to the acid salts of fusible or thermoplastic resins obtained by reacting resinous epoxides with amines containing two or more nitrogen atoms, having reactive hydrogen attached to the nitrogen atoms.

It is known that certain resinous epoxides react with certain diamines and polyamines to give resinous products. However, it has not been known heretofore that acid-soluble amine resins can be produced by reacting a resinous epoxide with diamines and polyamines.

According to the present invention, certain resinous epoxides can be reacted with an amine, or mixture of amines, containing two or more nitrogen atoms having reactive hydrogen atoms, to give acid-soluble polyamine resins. The water-soluble acid salts of such resins are useful in aqueous media as film forming materials.

In accordance with the invention the amine reactant must contain two or more primary or secondary amino nitrogens, preferably attached to aliphatic carbon atoms. Typical examples of such amines include: ethylene diamine, propylene diamine, N-methyl propylene diamine, N-propyl propylene diamine, and polyethylene polyamines, such as diethylene triamine, triethylene tetramine, tetraethylene pentamine, etc. In order to obtain resinous amines that are soluble in aqueous acids, the amine reactant generally should not contain an aliphatic chain longer than about four carbon atoms.

The resinous epoxides used in the invention are obtained by condensing polyhydric compounds, especially dihydric phenols, with polyfunctional halohydrins, especially epichlorohydrin and glycerol dichlorohydrin. These resinous epoxides contain at least one terminal 1,2-epoxide group per molecule and it is believed that it is the 1,2-epoxide group which reacts with the amine groups to give our novel resins which form water-soluble salts.

The resinous epoxides that are preferred reactants, i. e. those formed from dihydric phenols, may be further characterized as having alternating aliphatic chains and aromatic nuclei united through ether oxygen.

The resinous epoxides that are preferred reactants are those that are commercially available and which are prepared from dihydroxy diphenyl dimethyl methane, especially 4,4'-dihydroxy diphenyl dimethyl methane or commercial mixtures of this 4,4'-isomer with lesser quantities of the 2,2'-isomer and the 4,2'-isomer (i. e. Bisphenol A). These resinous epoxides generally contain from one to two, 1,2-epoxide groups per molecule and have epoxide equivalents of from 225 to 4000. Those having an epoxide equivalent not greater than 1000 are preferred in the present invention. They are available commercially under the trade-names, Epon resins and Araldite resins. Several such resinous epoxides are listed in Table I.

TABLE I

| Resinous Epoxide | Average Epoxide Equivalent | M. P.,° C. |
|---|---|---|
| I | 237 | 20–28 |
| II | 487 | 64–76 |
| III | 945 | 97–103 |

In carrying out the reaction between the amine and the resinous epoxide, it is preferred that the two reactants be mixed at room temperature and then heated to the desired reaction temperature, or that the resinous epoxide be added to the amine at the desired temperature. In other words, the reaction should preferably be carried out under such conditions as will avoid the presence of an excess of resinous epoxide at any time during the course of the reaction. In instances where the amine is added dropwise to the resinous epoxide heated to reaction temperature, the reaction mixture may gel before the amine is completely reacted.

The ratio of amine reactant to resinous epoxide is also critical, especially the lower ratio of amine to epoxide. In order to obtain amine resins that are soluble in dilute acids and in order to avoid the formation of thermoset gels, it is necessary that the amine to resinous epoxide ratio be at least sufficient to give an amine resin containing at least 1.5% titratable nitrogen. Using simple diamines it is usually necessary to use 1.1 equivalents of amine to each epoxide group, considering each reactive hydrogen of the amine equivalent to one epoxide group. However, with the more complex polyethylene polyamines this ratio of equivalents of amine to epoxide equivalents can be much lower as will be illustrated hereinafter. The upper limit of the ratio of amine to epoxide group is not particularly critical and is governed chiefly by the amount that is theoretically possible to introduce into the resinous epoxide molecule, i. e. one mole of amine for each epoxide equivalent. In general, it has been noted that the resinous amine product must contain at least 1.5% titratable nitrogen to be soluble in dilute weak acids, i. e. capable of forming water-soluble acid salts.

The novel resinous amines of the present invention are useful, especially in the form of aqueous solutions of their water-soluble salts, as film formers and coating resins. An aqueous solution of the water-soluble acetate salt is made, for instance, by neutralizing the resin with aqueous acetic acid. Acids other than acetic acid can be used to form the water-soluble salts. However, the acids must be chosen judiciously since many acids will form water-insoluble salts with the resinous amines. In general, acids having an ionization constant greater than $2 \times 10^{-4}$ are likely to form insoluble salts whereas weaker acids such as formic and propionic acid will form water-soluble salts.

The following examples in which the parts are by weight unless otherwise specified will further illustrate the invention.

Example 1

400 parts (0.825 equivalents of epoxide) of resinous epoxide II (Table 1) and 156 parts of tetraethylene pentamine were mixed with 400 parts of toluene at room temperature and then heated to reflux. After refluxing for one hour, the toluene and unreacted tetraethylene pentamine were removed by distillation under reduced pressure, finishing at 175° C. and 3.5 mm. mercury pressure. The yield of resin was 508 parts and the resin contained 7.55% titratable nitrogen. An aqueous solution containing 30% resin, obtained by neutralizing the resin with an equivalent amount of dilute acetic acid, had a viscosity of 0.5 poises (Gardner-Holdt) at 25° C.

Example 2

400 parts toluene
400 parts resinous epoxide II (0.825 equivalents)
72 parts N-methyl propylene diamine (0.818 mole)

The above materials were mixed at room temperature and then heated to reflux. After refluxing for one hour, the toluene and unreacted diamine were removed by distillation under reduced pressure, finishing at 150° C. and 44 mm. of mercury pressure. The yield of resinous amine containing 4.02% titratable nitrogen, was 456 parts. An aqueous solution containing 25% resin obtained by neutralizing the resin with an equivalent amount of dilute acetic acid, had a viscosity of less than 0.5 poises (Gardner-Holdt) at 25° C.

Table II illustrates several other resinsous amines made by procedures similar to those of Examples 1 and 2. The data in this table further illustrate the relationship between the amine to resinous epixode ratio, the percent titratable nitrogen in the resin, and the solubility of the resin dilute acid.

TABLE II

| Polyamine Amine [1] | Resinous Epoxide [2] | Ratio of Amine to Epoxide [3] | Percent Titratable Nitrogen | Solubility of Acetate Salt |
|---|---|---|---|---|
| E. D. | II | 3.16 | 4.16 | soluble. |
| E. D. | II | 2.64 | 3.53 | Do. |
| E. D. | II | 1.10 | 1.53 | Do. |
| E. D. | III | 3.96 | 2.77 | Do. |
| E. D. | I | 3.36 | 8.89 | Do. |
| M. P. D. | II | 3.18 | 4.02 | Do. |
| T. E. P. | II | 4.60 | 7.55 | Do. |
| T. E. P. | II | 1.73 | 3.24 | Do. |
| D. E. T. | III | 0.84 | 1.93 | Do. |

[1] For convenience, the following abbreviations have been used: E. D. for ethylene diamine; M. P. D. for N-methyl propylene diamine; T. E. P. for tetraethylene pentamine and D. E. T. for diethylene triamine.
[2] The Roman numerals used in this column refer to the resinous epoxides listed in Table I.
[3] The ratios listed in this column are the ratios of the equivalents of basic hydrogen in the polyamine to equivalents of epoxide.

It will be understood that the practice of the invention is not limited to resins described in the specific examples but that various modifications may be made therein without departing from the scope of the invention as it is defined in the appended claims.

We claim:

1. An aqueous solution of a water-soluble salt of an amine resin, said amine resin being the reaction product of an aliphatic polyamine with a resinous epoxide having an epoxide equivalent of 225 to 1000 and at least one 1,2-epoxide group per molecule and having alternating aliphatic chains and aromatic nuclei united through ether oxygen, said amine containing at least two nitrogen atoms having reactive hydrogen and containing no aliphatic chain longer than 4 carbon atoms, said amine resin being further characterized by containing at least 1.5% nitrogen and by being soluble in dilute aqueous solutions of acid having ionization constants less than $2 \times 10^{-4}$.

2. The aqueous solution of claim 1 in which the water-soluble salt is the acetic acid salt.

3. An aqueous solution of a water-soluble salt of an amine resin, said resin being the reaction product of an aliphatic diamine with a resinous epoxide having an epoxide equivalent of 225 to 1000 and at least one 1,2-epoxide groups per molecule and having alternating aliphatic chains and aromatic nuclei united through ether oxygen, and each nitrogen atom of the said diamine having at least one hydrogen and containing no aliphatic chain longer than 4 carbon atoms, said amine resin being further characterized by containing at least 1.5% nitrogen and by being soluble in dilute aqueous solutions of acids having ionization constants less than $2 \times 10^{-4}$.

4. The aqueous solution of claim 3 in which the water-soluble salt is the acetic acid salt.

5. An aqueous solution of the acetic acid salt of a resin as claimed in claim 3 wherein the aliphatic diamine is ethylene diamine.

6. An aqueous solution of the acetic acid salt of a resin as claimed in claim 3 wherein the diamine is N-methyl propylene diamine.

7. An aqueous solution of the water-soluble salt of an amine resin, said resin being the reaction product of a polyethylene polyamine with a resinous epoxide having an epoxide equivalent of 225 to 1000 and at least one 1,2-epoxide group per molecule and having alternating aliphatic chains and aromatic nuclei united through ether oxygen, said amine resin being further characterized by containing at least 1.5% nitrogen and by being soluble in dilute aqueous solutions of acids having ionization constants less than $2 \times 10^{-4}$.

8. The aqueous solution of claim 7 in which the water-soluble salt is the acetic acid salt.

9. An aqueous solution of the acetic acid salt of a resin as claimed in claim 7 wherein the polyethylene polyamine is diethylene triamine.

10. An aqueous solution of the acetic acid salt of a resin as claimed in claim 7 wherein the polyethylene polyamine is triethylene tetramine.

11. An aqueous solution of the acetic acid salt of a resin as claimed in claim 7 wherein the polyamine is tetraethylene pentamine.

References Cited in the file of this patent

UNITED STATES PATENTS

| 2,500,600 | Bradley | Mar. 14, 1950 |
| 2,640,037 | Parry et al. | May 26, 1953 |
| 2,651,589 | Shokal et al. | Sept. 8, 1953 |
| 2,681,901 | Wiles et al. | June 22, 1954 |